(12) United States Patent
Zanetti et al.

(10) Patent No.: US 10,927,431 B2
(45) Date of Patent: Feb. 23, 2021

(54) MULTILAYER FILMS AND RELATED USES THEREOF

(71) Applicants: Dow Quimica de Colombia S.A., Bogota (CO); PBBPolisur S.R.L., Buenos Aires (AR); Dow Global Technologies LLC, Midland, MI (US)

(72) Inventors: Maximiliano Zanetti, Bahia Blanca (AR); Miguel Molano Niampira, Bogota (CO); Jorge C. Gomes, Sao Paulo (BR)

(73) Assignees: Dow Global Technologies LLC, Midland, MI (US); PBBPolisur S.R.L., Buenos Aires (AR); Dow Quimica de Colombia S.A., Bogota (CO)

( * ) Notice: Subject to any disclaimer, the term of this patent is extended or adjusted under 35 U.S.C. 154(b) by 516 days.

(21) Appl. No.: 15/540,225

(22) PCT Filed: Dec. 15, 2015

(86) PCT No.: PCT/US2015/065769
§ 371 (c)(1),
(2) Date: Jun. 27, 2017

(87) PCT Pub. No.: WO2016/109183
PCT Pub. Date: Jul. 7, 2016

(65) Prior Publication Data
US 2018/0002780 A1 Jan. 4, 2018

Related U.S. Application Data

(60) Provisional application No. 62/098,534, filed on Dec. 31, 2014.

(51) Int. Cl.
*B32B 3/24* (2006.01)
*C22B 3/42* (2006.01)
(Continued)

(52) U.S. Cl.
CPC ............... *C22B 3/42* (2013.01); *B32B 3/266* (2013.01); *B32B 27/08* (2013.01); *B32B 27/306* (2013.01);
(Continued)

(58) Field of Classification Search
CPC ............ B32B 3/266; Y10T 428/24331; Y10T 428/24322
See application file for complete search history.

(56) References Cited

U.S. PATENT DOCUMENTS

| 5,250,272 A | 10/1993 | Knorre et al. |
| 5,272,236 A | 12/1993 | Lai et al. |

(Continued)

FOREIGN PATENT DOCUMENTS

| JP | H05-169583 A | 7/1993 |
| JP | H09-141091 A | 6/1997 |

(Continued)

OTHER PUBLICATIONS

International Search Report and Written Opinion from International Application No. PCT/US2015/065769, dated Mar. 15, 2016 (10 pages).

(Continued)

*Primary Examiner* — William P Watkins, III

(57) ABSTRACT

Embodiments disclosed herein include multilayer films that have at least two layers. More particularly, disclosed in embodiments herein are multilayer films that include at least a first layer and a second layer, wherein the first layer includes at least one polyethylene polymer, wherein the second layer includes at least one water-soluble polymer, wherein the second layer is insoluble in water at a temperature of less than 20° C., wherein the second layer is soluble in water at a temperature of 20° C. or greater, and wherein the first layer has one or more openings through the first (Continued)

layer to expose the second layer. Also disclosed herein are methods of using such multilayer films for extracting metal from metal ore.

12 Claims, 4 Drawing Sheets

(51) Int. Cl.
| | |
|---|---|
| *B32B 27/08* | (2006.01) |
| *B32B 27/30* | (2006.01) |
| *B32B 27/32* | (2006.01) |
| *B32B 3/26* | (2006.01) |
| *C22B 3/00* | (2006.01) |
| *C22B 11/08* | (2006.01) |

(52) U.S. Cl.
CPC ............ *B32B 27/308* (2013.01); *B32B 27/32* (2013.01); *B32B 27/327* (2013.01); *C22B 11/04* (2013.01); *C22B 11/08* (2013.01); *B32B 2307/50* (2013.01); *B32B 2307/54* (2013.01); *B32B 2307/542* (2013.01); *B32B 2307/582* (2013.01); *B32B 2307/5825* (2013.01); *B32B 2307/7166* (2013.01); *B32B 2307/7265* (2013.01); *Y02P 10/20* (2015.11); *Y10T 428/24322* (2015.01); *Y10T 428/24331* (2015.01)

(56) References Cited

U.S. PATENT DOCUMENTS

| | | |
|---|---|---|
| 6,100,341 A | 8/2000 | Friedman |
| 6,486,284 B1 | 11/2002 | Karande et al. |
| 6,491,928 B1 * | 12/2002 | Smith, III ............... A61F 13/36 424/401 |
| 6,521,338 B1 | 2/2003 | Maka |
| 7,847,029 B2 | 12/2010 | Butler et al. |
| 8,679,602 B2 | 3/2014 | Michie, Jr. et al. |
| 2004/0157041 A1 | 8/2004 | LeBoeuf et al. |
| 2008/0038571 A1 | 2/2008 | Klitzmiller et al. |
| 2008/0176981 A1 | 7/2008 | Biscoglio et al. |
| 2008/0206461 A1 | 8/2008 | Patel |
| 2009/0183599 A1 | 7/2009 | Mawby et al. |
| 2011/0042086 A1 * | 2/2011 | Drochon ................. C04B 28/02 166/285 |

FOREIGN PATENT DOCUMENTS

| | | |
|---|---|---|
| JP | H11-000965 A | 1/1999 |
| JP | 2013-052511 A | 3/2013 |
| WO | 95/11319 A1 | 4/1995 |

OTHER PUBLICATIONS

English Translation of JP Office Action for Japanese Counter Part Application No. 2017-534841, drafted Nov. 7, 2019 (3 pages).

* cited by examiner

MULTILAYER FILMS AND RELATED USES THEREOF

PRIORITY CLAIM

This application claims the benefit of U.S. Provisional Patent Application Ser. No. 62/098,534 filed Dec. 31, 2014, entitled MULTILAYER FILMS AND RELATED USES THEREOF, the disclosure of which is incorporated herein by reference in its entirety.

TECHNICAL FIELD

Embodiments of the present disclosure relate to multilayer films that have at least two layers. More particularly, embodiments of the present disclosure relate to multilayer films that have at least one layer that is water soluble at a given temperature and at least one additional layer that includes polyethylene and has one or more through openings that expose the water soluble layer. The multilayer films can be used in mining applications.

BACKGROUND

Mining of metal (e.g., a precious metal such as gold) can include creating one or more piles of metal containing ore and then irrigating the top of a pile or piles with a metal extraction solution. An example of extracting gold from gold ore is described herein below with reference to the gold mining system 100 shown in FIG. 1. As shown in FIG. 1, a first volume (pile) of gold ore 120 is positioned over barrier membrane 105 and a liquid collection system including a collection pipe 110 coupled to barrier membrane near coupling point 111. The first volume of gold ore 120 can be about 10 meters high. Barrier membrane 105 (also referred to as a geomembrane) can be a 2 mm thick high density polyethylene membrane that is nonbiodegradable and impermeable to air and moisture.

To extract gold from the first volume of gold ore 120, a gold extraction solution can be dispensed from one or more irrigation pipes 150 positioned above the first volume of gold ore 120 so that the gold extraction solution can flow through the first volume of gold ore 120 and react with gold in the ore and become solubilized and carried with the gold extraction solution to the bottom of the first volume of gold ore 120 via gravity. An exemplary gold extraction solution includes an aqueous solution including sodium cyanide (about 0.05%) and having a temperature of about 25-30° C. and a pH of greater than about 10.5. The gold extraction solution including solubilized gold can be collected using collection pipe 110.

When the extraction of gold from the first volume of gold ore 120 is complete, a second volume of gold ore 130 can be positioned on top of the first volume of gold ore 120. The irrigation pipes 150 can be repositioned over the second volume of gold ore 130 and the gold extraction process that was performed on the first volume of gold ore 120 can be repeated for the second volume of gold ore 130. Additional gold extraction solution can be used to extract gold from the second volume of gold ore 130 as the gold extraction solution flows through the second volume of gold ore 130 via gravity. After flowing through the second volume of gold ore 130, the gold extraction solution flows through the first volume of gold ore 120 via gravity. The gold extraction solution including solubilized gold can be collected using collection pipe 110.

When the extraction of gold from the second volume of gold ore 130 is complete, a third volume of gold ore 140 can be positioned on top of the second volume of gold ore 130. The irrigation pipes 150 can be repositioned over the third volume of gold ore 140 and the gold extraction process that was performed on the second volume of gold ore 130 can be repeated for the third volume of gold ore 140. Additional gold extraction solution can be used to extract gold from the third volume of gold ore 140 as the gold extraction solution flows through the third volume of gold ore 140 via gravity. After flowing through the third volume of gold ore 140, the gold extraction solution flows through the second volume of gold ore 130 and the first volume of gold ore 120 via gravity. The gold extraction solution including solubilized gold can be collected using collection pipe 110.

The process of extracting gold from 10 meter high volumes of gold ore stacked on top of each other can be repeated for up to 15 volumes of gold ore, which equals about 150 meters in total. This process can suffer from one or more drawbacks. For example, it can take about one day for the gold extraction solution to travel one meter. Thus, it can take at least 150 days to recover gold extraction solution after irrigating the fifteenth volume of gold ore with gold extraction solution. Also, sulfur can be present in the ore and can react preferentially with cyanide thereby decreasing extraction of gold as more volumes of gold ore are added and, hence, the amount of sulfur that the cyanide may contact and react with is increased. Also, the gold extraction solution can be retained by the gold ore which also can also reduce the yield of gold. As more volumes of gold ore are added the chances for more gold extraction solution being retained by the gold ore can also increase, thereby reducing the yield of gold. For example, gold extraction can be reduced from 80% for the first volume of gold ore to 72% for $15^{th}$ volume of gold ore.

When the extraction of gold from the last volume of gold ore is complete all of volumes of gold ore can be washed with a washing liquid to help remove residual cyanide from the gold extraction solution that may be present. An example of a washing liquid includes an aqueous solution having a temperature of 20° C. or greater. For example, with reference to FIG. 1, when extraction of gold from the third volume of gold ore 140 is complete then the first volume of gold ore 120, the second volume of gold ore 130, and the third volume of gold ore 140 can be washed. The washing liquid can be dispensed from the irrigation pipe 150 that is positioned over the third volume of gold ore 140 so that the washing liquid can flow through and wash the first volume of gold ore 120, the second volume of gold ore 130, and the third volume of gold ore 140. The washing liquid does not penetrate barrier membrane 105, but is instead collected in collection pipe 110. Irrigation pipes 150 can be expensive so it is desirable to reposition them above each volume of gold ore as each additional volume of gold ore is added for extraction purposes.

There is a continuing need to improve metal extraction process such as gold extraction processes.

SUMMARY

Disclosed in embodiments herein are multilayer films that include at least a first layer and a second layer, wherein the first layer includes at least one polyethylene polymer, wherein the second layer includes at least one water-soluble polymer, wherein the second layer is insoluble in water at a temperature of less than 20° C., wherein the second layer is soluble in water at a temperature of 20° C. or greater, and wherein the first layer has one or more openings through the first layer to expose the second layer.

Further disclosed in embodiments herein are methods of extracting metal from metal ore, the methods including:

providing a barrier membrane:

positioning a first volume of metal ore over the barrier membrane;

positioning a multilayer film over the first volume of metal ore, wherein the multilayer film includes at least a first layer and a second layer, wherein the first layer includes at least one polyethylene polymer, wherein the second layer includes at least one water-soluble polymer, wherein the second layer is insoluble in water at a temperature of less than 20° C., wherein the second layer is soluble in water at a temperature of 20° C. or greater, and wherein the first layer has one or more openings through the first layer to expose the second layer;

positioning a second volume of metal ore over the multilayer film over; and dispensing a metal extraction solution onto the second volume of metal ore so that the metal extraction can contact at least a portion of the second volume of metal ore to extract metal from the metal ore, wherein at least a portion of the solution flows through the second volume of metal ore and is in fluid communication with the drain system.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawing.

It is to be understood that both the foregoing and the following description describe various embodiments and are intended to provide an overview or framework for understanding the nature and character of the claimed subject matter. The accompanying drawing is included to provide a further understanding of the various embodiments, and are incorporated into and constitute a part of this specification. The drawing illustrates the various embodiments described herein, and together with the description serves to explain the principles and operations of the claimed subject matter.

DETAILED DESCRIPTION

Reference will now made in detail to embodiments of multilayer films and materials used to make such films.

Resins and/or films for use in multilayers films as described herein can be characterized by a variety of parameters including one or more melt index $I_{2.16}$; density; $I_{10}/I_{2.16}$ distribution; Dart Drop Impact (DDI), Puncture Resistance, Energy to Break, Elmendorf Tear Strength in the machine direction (MD) and the cross direction (CD); and the like.

Melt Index $I_{2.16}$ can be reported in decigrams/minute and can be measured in accordance with ASTM D-1238 (condition 190° C. with a 2.16 kg load). Melt Index $I_{10}$ can be reported in decigrams/minute and can be measured in accordance with ASTM D-1238 (condition 190° C. with a 10 kg load).

Density can be reported in grams/cm$^3$ and can be measured in accordance with ASTM D-792.

Dart Drop Impact (DDI) value measures the impact resistance of plastic film. Dart drop impact values can be reported in grams (g) and can be measured according to ASTM 1709.

Puncture Resistance (also referred to as "puncture") measures the protrusion puncture resistance of a plastic film. Protrusion Puncture Resistance can be reported in Joules per cubic centimeter (J/cm$^3$) and can be measured according to ASTM 5748.

Energy to Break measures the energy at which the film is perforated. Energy to Break can be reported in Joules (J) and can be measured according to ASTM 5748.

Elmendorf Tear Strength, MD (also referred to herein as "Elmendorf MD") measures the tear strength of a plastic film in the machine direction. Elmendorf Tear Strength, MD can be reported in grams (g) and can be measured according to ASTM D1922.

Elmendorf Tear Strength, CD (also referred to herein as "Elmendorf CD") measures the tear strength of a plastic film in the cross (or transversal) direction. Elmendorf Tear Strength, CD can be reported in grams (g) and can be measured according to ASTM D1922.

Embodiments of the present disclosure include a multilayer film having at least a first layer and a second layer. The first layer includes at least one polyethylene polymer and the second layer includes at least one water-soluble polymer.

Figure 1:
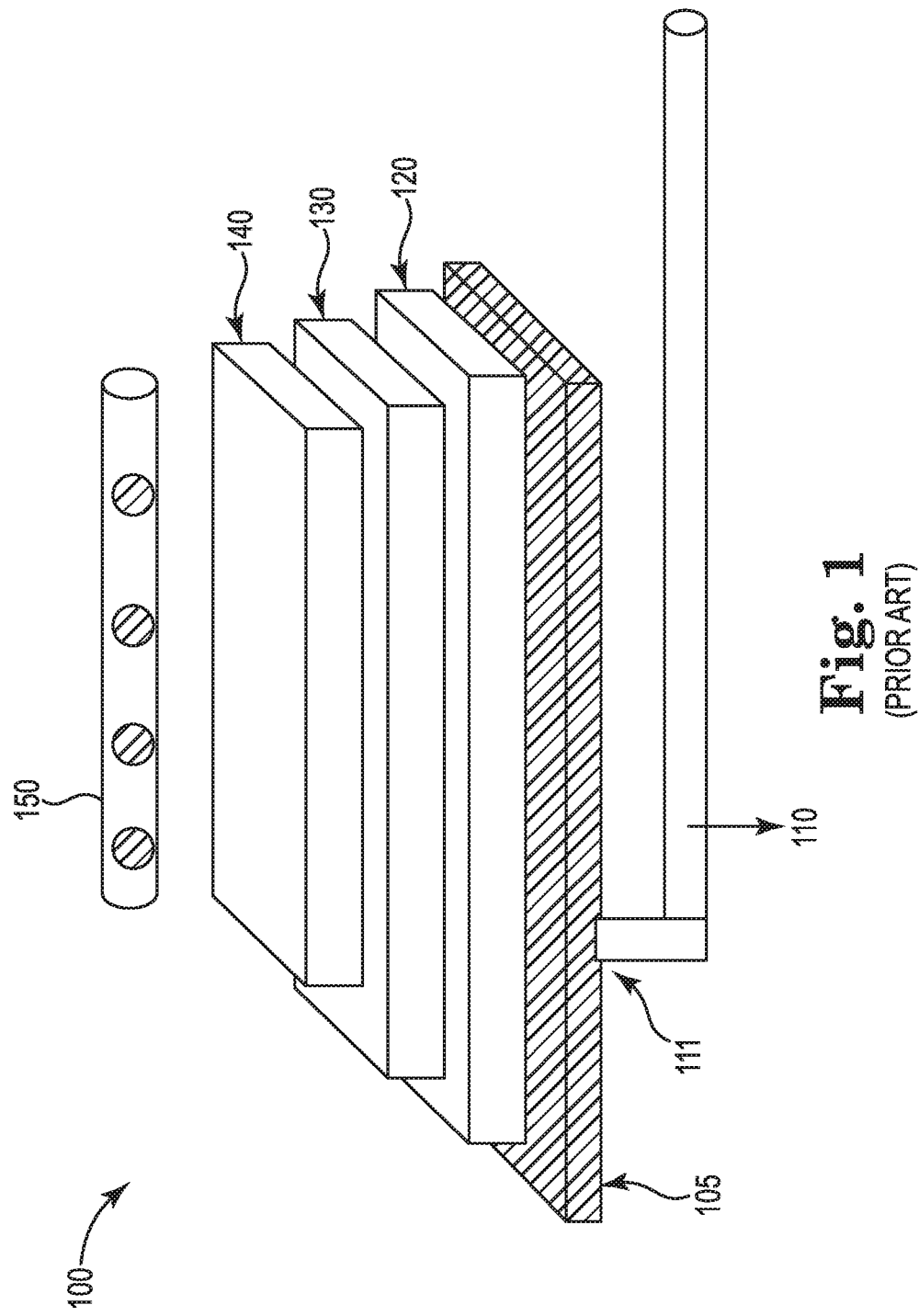
FIG. 1 is a perspective view of a schematic illustration showing a prior art gold mining system.
Figure 2:
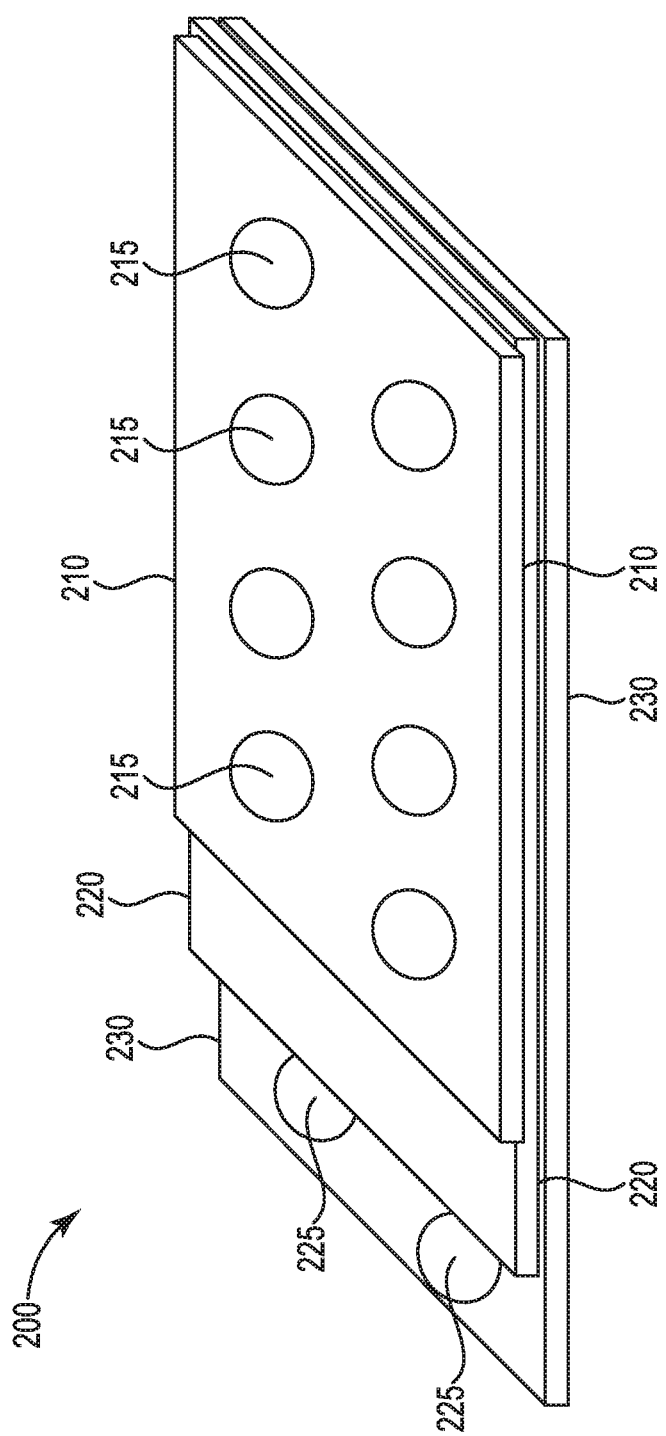
FIG. 2 is a perspective view of a schematic illustration showing an embodiment of a multilayer film.

For illustration purposes, one embodiment of a multilayer film described herein is shown in FIG. 2, As shown in FIG. 2, multilayer film 200 includes three layers first layer 210, second layer 220, and optional third layer 230. According to an alternative embodiment (not shown), a multilayer film as described herein could include only layers first layer 210 and second layer 220. As shown in FIG. 2, second layer 220 is positioned between first layer 210 and optional third layer 230. One side of layer 220 may contact first layer 210 and the opposite side of 220 may contact optional third layer 230. First layer 210 and optional third layer 230 may have either the same or different chemical and/or physical properties. Each of the first layer 210 and the optional third layer 230 include at least one polyethylene polymer. Second layer 220 includes at least one water-soluble polymer.

First Layer/Optional Third Layer

The first layer and optional third layer can include at least one polyethylene polymer. A polyethylene polymer can be selected to help provide desired physical and chemical durability to a multilayer film to help maintain the integrity of the multilayer film at least during a metal ore extraction phase of mining when the multilayer film is in contact with the metal ore and a metal extraction solution.

Embodiments of the present disclosure can include a first layer and optional third layer having a ultra-high-molecular-weight polyethylene (UHMWPE), a high-density polyethylene (HDPE), a cross-linked polyethylene (PEX or XLPE), a medium-density polyethylene (HDPE), a linear low-density polyethylene (LLDPE), a low-density polyethylene (LDPE), a very low-density polyethylene (VLDPE), ultra low-density polyethylene (ULDPE), and blends thereof. "ULDPE" and "VLDPE" can be used interchangeably. See, e.g., U.S. Publication Number 2008/0038571 (Klitzmiller et al.), the entirety of which publication is incorporated herein by reference. In some embodiments, VLDPE can refer to a polymer made by gas phase reaction techniques and ULDPE can refer to a polymer made by liquid phase (solution) reaction techniques.

Polyethylene polymers included in a first layer and optional third layer as described herein can be made by a variety of techniques. For example, polyethylene polymers may be produced via a gas phase or a solution phase and using single-site catalysts techniques and/or Ziegler-Natta catalyst techniques. Methods for producing olefin polymers using single site catalysts can be U.S. Pat. No. 5,272,236 (Lai et al.) and U.S. Pat. No. 6,486,284 (Karande et al.), the entireties of which patents are incorporated herein by reference. Single-site catalyst systems may include metallocene catalysts and post-metallocene catalysts. Ziegler-Natta catalysts are described in U.S. Publication Numbers 2008/0038571 (Klitzmiller et al.) and 2008/0176981 (Biscoglio et al.), the entirety of which publications are incorporated herein by reference.

Exemplary polyethylene polymers are described in U.S. Pat. No. 8,679,602 (Michie, Jr. et al.), U.S. Pat. No. 5,272,236 (Lai et al.), U.S. Pat. No. 6,486,284 (Karande et al.), U.S. Pat. No. 6,100,341 (Friedman), the entireties of which patents are incorporated herein by reference. In some embodiments, a first layer and optional third layer can include one or more olefin block copolymers. Exemplary olefin block copolymers include a copolymer of ethylene and at least one comonomer selected from the group consisting of $C_3$-$C_{20}$ α-olefins, diener, and cycloalkenes (e.g., ethylene-butene based block copolymers, ethylene-hexene based block copolymers, ethylene-octene based block copolymers, and the like). In some embodiments, a first layer and optional third layer can include one or more a copolymers of ethylene and at least one comonomer selected from the group consisting of $C_3$-$C_{20}$ α-olefins.

Exemplary polyethylene resins are commercially available under the tradenames DOWLEX™ TG2085B polyethylene resin and DOWLEX™ 2050B polyethylene resin from The Dow Chemical Company (Midland, Mich.).

In some embodiments, a polyethylene polymer or blend of polyethylene polymers can have a density less than 0980 grams/cm³. In some embodiments, a polyethylene polymer or blend of polyethylene polymers can have a density in the range from 0.880 to 0.980 grams/cm³, in the range from 0.890 to 0.970 grams/cm3, or even in the range from 0.900 to 0.960 grams/cm³.

In some embodiments, a polyethylene polymer or blend of polyethylene polymers can have a Melt Index $I_{10}/I_{2.16}$ in the range of 0.01 to 10.0 dg/min, from 0.05 to 5.0 dg/min, or even from 0.1 to 4.0 dg/min.

In some embodiments, a polyethylene polymer or blend of polyethylene polymers can have a $I_{10}/I_{2.16}$ distribution from 1 to 15, from 2 to 12, or even from 5 and 10.

In one embodiment, a first layer and optional third layer can include at least one copolymer of ethylene and at least one comonomer selected from the group consisting of $C_3$-$C_{20}$ α-olefins, wherein the copolymer of ethylene has a density in the range 0.900 to 0.960 grams/cm³ and a Melt Index $I_{2.16}$ in the range of 0.1 to 4.0 decigrams/minute, wherein melt index $I_{2.16}$ is measured in accordance with ASTM D-1238 (condition 190° C. with a 2.16 kg load) and density is measure in accordance with ASTM D-792.

A first layer and optional third layer including a polyethylene polymer can have one or more properties based on a variety of factors such as a desired physical and chemical durability to help maintain the integrity of the multilayer film at least during an ore extraction phase of mining when the multilayer film is in contact with an ore extraction solution, processability, cost, and the like.

In some embodiments, a first layer and optional third layer can have a thickness in the range from 20 to 400 micrometers, from 50 to 300 micrometers, or even from 70 to 150 micrometers.

In some embodiments, a first layer and optional third layer as described herein can have a Dart Drop impact (DDI) value in the range from 50 to 1500 grams. In some embodiments, a first layer and optional third layer as described herein can have a DDI value in the range from 100 to 1200 grains, or even from 200 to 800 grams.

In some embodiments, a first layer and optional third layer as described herein can have a Puncture Resistance value in the range from 0.1 to 15 J/cm³. In some embodiments, a first layer and optional third layer as described herein can have a Protrusion Puncture Resistance value in the range from 0.5 to 12 J/cm³, or even from 1 to 10 J.

In some embodiments, a first layer and optional third layer as described herein can have an Energy to Break value in the range from 0.01 to 15.0 J. In some embodiments, a first layer and optional third layer as described herein can have an Energy to Break value in the range from 0.1 to 10.0 J, or even 0.5 to 8 J.

In some embodiments, a first layer and optional third layer as described herein can have an Elmendorf Tear Strength, MD value in the range from 10 to 5000 g. In some embodiments, a layer including a polyethylene polymer as described herein can have an Elmendorf Tear Strength, MD value in the range from 50 to 3000 g, 100 to 2500 g, or even from 1500 to 2500 g.

In some embodiments, a first layer and optional third layer as described herein can have an Elmendorf Tear Strength, CD value in the range from 10 to 5000 g. In some embodiments, a first layer and optional third layer as described herein can have an Elmendorf Tear Strength, CD value in the range from 50 to 3000 g, 100 to 2500 g, or even from 1500 to 2500 g.

The first layer and optional third layer can be insoluble in water. For example, the first layer and optional third layer can be insoluble in water when the second layer is soluble in water. In some embodiments, the first layer and optional third layer can be insoluble in water at temperature from 20° C. to 100° C.

In embodiments disclosed herein, a first layer and optional third layer have one or more openings (also referred to as "perforations") through the layer to expose the second layer. An example of such openings is illustrated with respect to FIGS. 2 and 3. As shown in FIG. 2, first layer 210 includes openings 215 through first layer 210 and optional third layer 230 includes openings 225 through optional third layer 230. The openings 215 and 225 expose second layer 220.

While each of the first layer 210 and optional third layer 230 include polyethylene and are insoluble in water, the first layer 210 and optional third layer 230 can be independently formulated and constructed to have different chemical and/or physical properties, including the size and configuration of openings 215 and 225.

Opening (i.e., hole) size, shape, and the like can be selected based on one or more of a variety of factors such as the desired physical durability to help maintain the integrity of the multilayer film at least during an ore extraction phase of mining when the multilayer film is in contact with an ore extraction solution; the size or diameter of the pieces of ore material (e.g., "rocks") in a volume ore to be mined;

processing considerations in making the openings; the amount of scrap generated; etc.

Figure 3:
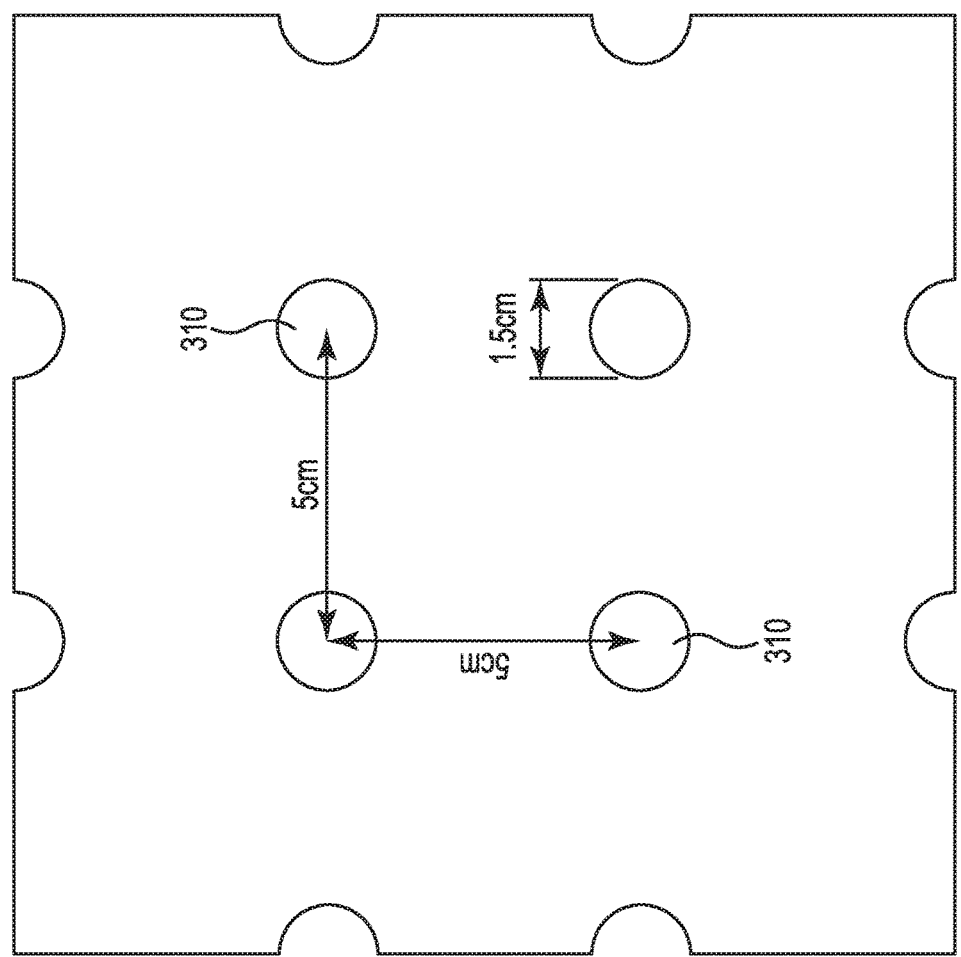
FIG. 3 is a plan view of an embodiment of a layer that includes polyethylene and a plurality of openings.

One embodiment of a first layer and optional third layer that include openings is shown as film 300 in FIG. 3 and is described below.

In some embodiments, a first layer and optional third layer as described herein can include openings having any desired shape such as circular, square, oval, etc., and combinations thereof. In an exemplary embodiment shown in FIG. 3, openings 310 are circular in shape.

In some embodiments, a first layer and optional third layer as described herein can include openings having a diameter in the range from 0.1 to 10 cm, from 0.5 to 5 cm, or even from 0.5 to 3 cm. In an exemplary embodiment shown in FIG. 3, openings 310 have a diameter of about 1.5 cm.

In some embodiments, a first layer and optional third layer as described herein can include openings having an opening area in the range from 0.01 to 79 $cm^2$, from 0.2 to 20 $cm^2$, or even from 0.2 to 7 $cm^2$. In an exemplary embodiment shown in FIG. 3, openings 310 have an area of about 1.8 $cm^2$.

In some embodiments, a first layer and optional third layer as described herein can include openings having any desired opening spacing. Opening spacing refers to the distance between adjacent openings. In an exemplary embodiment shown in FIG. 3, the distance from the center of one opening 310 to the center of an adjacent opening 310 is about 5 cm. In some embodiments, the distance between the centers of adjacent openings can be in the range from 1 to 15 cm, from 2 to 10 cm, or even from 3 to 8 cm.

In some embodiments, a first layer and optional third layer as described herein can include openings having any desired opening density. Opening density refers to the number of full openings per unit area of a first layer or optional third layer. In an exemplary embodiment shown in FIG. 3, the opening density of film 300 is about 0.1 openings/$cm^2$. The opening density of film 300 is calculated as follows: in an area of 6.5 cm×6.5 cm (or 42.24 $cm^2$) there are 4 Hi openings 310, which corresponds to 4 openings/42.24 $cm^2$ (or about 0.1 openings/$cm^2$). In some embodiments, at least a portion of a first layer and optional third layer as described herein can have an opening density in the range from 0.01 to 2 openings/$cm^2$, from 0.05 to 1.0 openings/$cm^2$, or even from 0.05 to 0.5 openings/$cm^2$.

Second Layer

The second layer may be present as one or more layers of the multilayer film. The second layer can include one or more water soluble polymers so that the second layer is insoluble in water at a first temperature and soluble in water at a second temperature. As used herein, the meaning of "insoluble" and "soluble" in water with respect to the second layer is described herein below. For example, a second layer that is "insoluble" in water at a given temperature means that the second layer can be formulated to be insoluble in water at a temperature at which a metal extraction solution will contact the second layer during a metal extraction phase of an metal extraction process so that the metal extraction solution does not dissolve any portion of the second layer to an undue degree and allow the metal extraction solution to permeate through the multilayer film. An example of a metal extraction solution (also referred to as a lixiviant solution) includes an aqueous sodium cyanide solution at a pH greater than about 10.5 and at a temperature of about 25-30° C. During the metal extraction phase the metal extraction solution can flow along a top surface of the multilayer film into a collection system that is in fluid communication with the top surface of the multilayer film. A second layer that is "soluble" in water at a given temperature means that the second layer can be formulated to be soluble in water at a temperature at which an aqueous washing solution heated water) will contact the second layer during an ore washing phase of a metal extraction process so that the washing liquid can dissolve at least a portion of the water-soluble second layer and flow through the multilayer film at an appropriate flow rate for washing the ore below the multilayer film. The second (water-soluble) layer as used during a mining process is further discussed with respect to FIG. 4 below.

The one or more water-soluble polymers can be selected to be insoluble at a relatively lower temperature as compared to the temperature at which the polymer is soluble in water. The temperature at which a polymer is selected to be insoluble in water at can depend on a variety factors including the ambient temperature of the metal ore, the temperature of the metal extracting solution when it is in contact with the multilayer film under a volume of metal ore, the temperature of the ore washing liquid when it is in contact with the multilayer film under a volume of ore, combinations of these, and the like.

In some embodiments, a second layer of a multilayer film described herein can include one or more water-soluble polymers so that the second layer is insoluble in water at a temperature of less than 20° C. and soluble in water at a temperature of 20° C. or greater. In some embodiments, a second layer of a multilayer film described herein can include one or more water soluble polymers so that the second layer is insoluble in water at a temperature of 50° C. or less and soluble in water at a temperature of greater than 50° C. In some embodiments, a second layer of a multilayer film described herein can include one or more water soluble polymers so that the second layer is insoluble in water at a temperature of less than 60° C. and soluble in water at a temperature of 60° C. or greater. In some embodiments, a second layer of a multilayer film described herein can include one or more water soluble polymers so that the second layer is insoluble at a temperature of less than 20° C. and soluble in water at a temperature in the range from 20° C. to 90° C. A blend of polymers having a range of solubilities can be used in a second layer so that the second layer has the appropriate solubility at a given temperature.

Exemplary water-soluble polymers include polyvinyl alcohol (PVOH), polyvinyl acetate (PVA), poly-acryl amide, and blends thereof.

Exemplary water-soluble resins are commercially available under the tradenames Mowiflex® LP TC 251 resin, Mowiflex® LP TC 661 resin, and Mowiflex® LP TC 161 resin from MonoSol, LLC, Portage, Ind.

Exemplary second layers are commercially available under the tradename MonoSol® M1030 film from MonoSol, LLC, Portage. N.

A second layer can have a thickness based on a variety of factors such as solubility at a given temperature, environment it will be used in, processability, cost, and the like. In some embodiments, a second layer can have a thickness in the range from 10 to 300 micrometers, 20 to 60 micrometers, or even 30 to 50 micrometers.

In some embodiments, a second layer as described herein can have a Dart Drop Impact (DDI) value in the range from 200 to 1500 grams. In some embodiments, a second layer as described herein can have a DDI value in the range from 700 to 1200 grams, or even 800 to 1100 grams.

In some embodiments, a second layer as described herein can have a Puncture Resistance value in the range from 0.5 to 20 $J/cm^3$. In some embodiments, a second layer as described herein can have a Puncture Resistance value in the range from 1 to 15 J/cm$^3$, or even 5 to 10 J/cm$^3$.

In some embodiments, a second layer as described herein can have an Energy to Break value in the range from 0.01 to 15.0 J. In some embodiments, a second layer as described herein can have an Energy to Break value in the range from 0.5 to 10.0 J, or even 1.0 to 5.0 J.

In some embodiments, a second layer as described herein can have an Elmendorf Tear Strength, MD value in the range from 100 to 1500 g. In some embodiments, a second layer as described herein can have an Elmendorf Tear Strength, MD value in the range from 300 to 1200 g, or even 500 to 1000 g.

In some embodiments, a second layer as described herein can have an Elmendorf Tear Strength, CD value in the range from 100 to 1500 g. In some embodiments, a second layer as described herein can have an Elmendorf Tear Strength, CD value in the range from 300 to 1200 g, or even 500 to 1000 g.

The multilayer films described herein can be made using a variety of techniques including cast film techniques and/or blown film techniques. A method of making blown films is described in U.S. Pat. No. 6,521,338 (Maka), the entirety of which patent is incorporated herein by reference. A method of making a cast film is described in U.S. Pat. No. 7,847,029 (Butler et al.), the entirety of which patent is incorporated herein by reference. In some embodiments, a first layer, second layer, and optional third layer can be formed individually and then laid on top of each other to form a multilayer film structure. For example, a first layer and optional third layer can be formed by blown film techniques and then a plurality of openings can be formed into the first layer and optional third layer using a die cutting apparatus. A second layer can be formed using casting techniques. The first layer can be laid on top of the second layer. Optionally, the second layer can be laid on top of a third layer to form the "sandwich" structure shown in FIG. 2. Using heat, adhesives, and the like are not necessary when combining the first layer with the second layer (and optional third layer).

In some embodiments, a multilayer film can have a thickness in the range from 20 to 1000 micrometers, 50 to 500 micrometers, or even 100 to 400 micrometers.

Uses

Multilayer films disclosed in embodiments herein can be used in mining processes such as extracting precious metal from a metal ore using a metal extraction solution. An example of such a process is described with reference to FIGS. 2 and 4.

Figure 4:
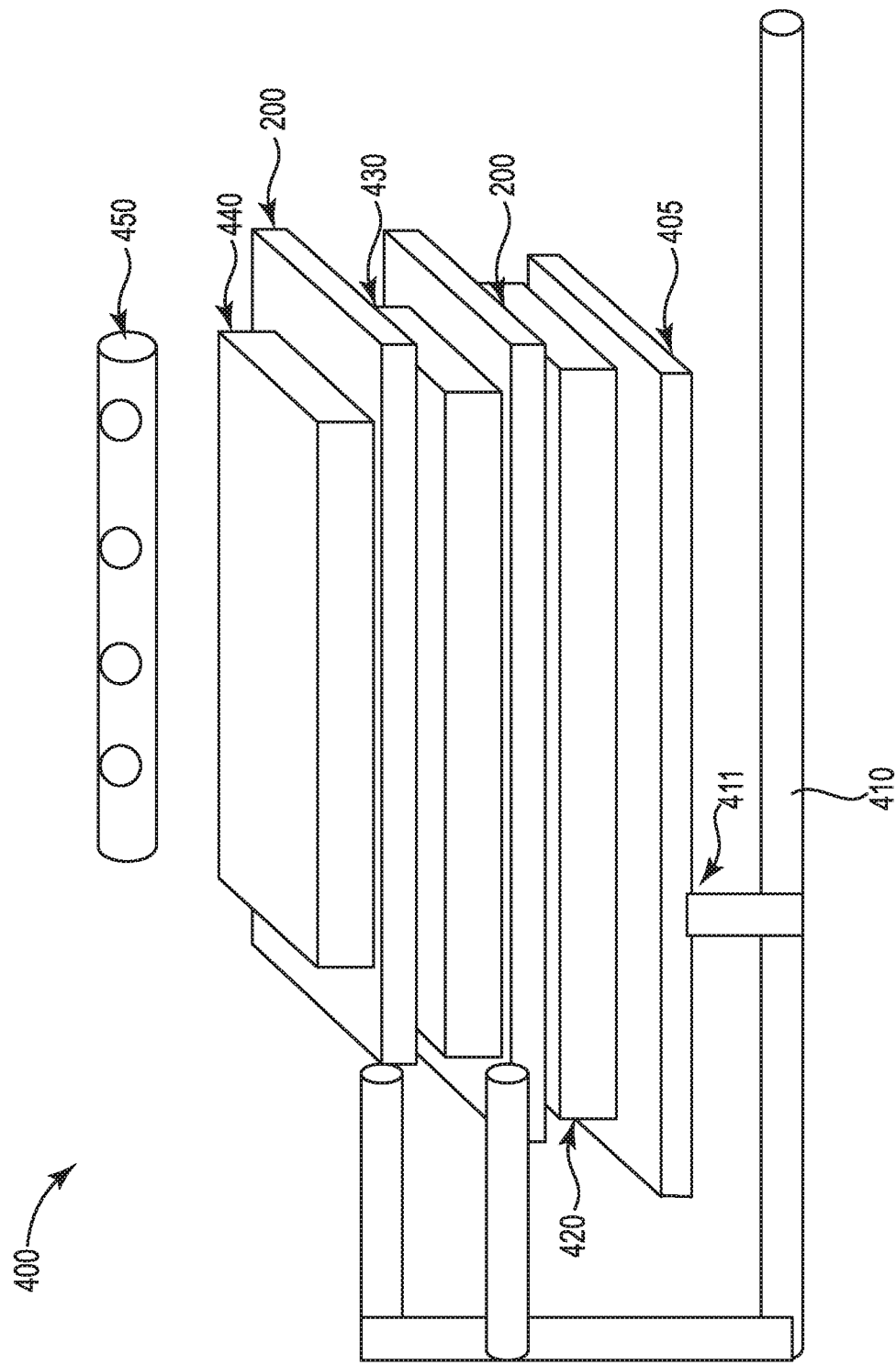
FIG. 4 is a perspective view of a schematic illustration showing a gold mining system that includes a multilayer film according to embodiments disclosed herein.

FIG. 4 is a perspective view of a schematic illustration showing a gold mining system 400 that includes a multilayer film according to embodiments disclosed herein. As shown in FIG. 4, a first volume of gold ore 420 is positioned over harrier membrane 405 and a liquid collection system including collection pipes 410 is coupled to barrier membrane 405 at coupling point 411. The first volume of gold ore 420 includes ore having a diameter of about one inch. The first volume of gold ore 420 can include about 84 "cells" stacked next to each other. Each cell can be about 80 meters long, 60 meters wide, and about 10 meters high. In some embodiments, barrier membrane 405 can be a 2 mm thick high density polyethylene membrane that is nonbiodegradable and impermeable to air and moisture (barrier membrane 405 can also be referred to as a geomembrane). An example of a suitable barrier membrane is described in U.S. Pat. No. 8,679,602 (Michie, Jr., et al.), the entirety of which patent is incorporated herein by reference.

To extract a precious metal such as gold from the first volume of gold ore 420, a gold extraction solution can be dispensed from one or more irrigation pipes 450 positioned above first volume of gold ore 420 so that the gold extraction solution can flow through the first volume of gold ore 420 and react with gold in the ore and become solubilized and carried with the gold extraction solution to the bottom of the first volume of gold ore 420 via gravity. An exemplary gold extraction solution includes an aqueous solution including sodium cyanide (about 0.05%) and having a temperature of about 25 to 30° C. and a pH of greater than about 10.5. The gold extraction solution including solubilized gold can be collected using collection pipe 410.

When the extraction of gold from the first volume of gold ore 420 is complete, a multilayer film 200 can be positioned on top of the first volume of gold ore 420. A collection pipe 410 and second volume of gold ore 430 can be positioned over multilayer film 200. The irrigation pipes 450 can be repositioned over the second volume of gold ore 430 and the gold extraction process that was performed on the first volume of gold ore 420 can be repeated for the second volume of gold ore 430. Additional gold extraction solution can be used to extract gold from the second volume of gold ore 430 as the gold extraction solution flows through the second volume of gold ore 430 via gravity. The gold extraction solution is at a temperature below the water solubility temperature of second layer 220 in multilayer film 200 so that the gold extraction solution does not permeate through multilayer film 200, but instead is collected by collection pipe 410 positioned above multilayer film 200. Advantageously, and without being bound by theory, it is believed that because the gold extraction solution only has to flow through the second volume of gold ore 430, the time that it takes to collect the extraction solution from the second volume of gold ore 430 can be reduced as compared to if the solution had to flow through the first volume of gold ore 420 as \veil. Also, in the context of when a sodium cyanide solution is used as the metal extraction solution, it is believed that the extraction yield can be increased because preferential reaction of the sodium cyanide with sulfur in first volume of gold ore 420 can be avoided. It is further believed that the extraction yield can also be increased because retention of a portion of metal extraction solution in the first volume of gold ore 420 is avoided.

When the extraction of gold from the second volume of gold ore 430 is complete, a multilayer film 200 can be positioned on top of the second volume of gold ore 430. A collection pipe 410 and third volume of gold ore 440 can be positioned over multilayer film 200. The irrigation pipes 450 can be repositioned over the third volume of gold ore 440 and the gold extraction process that was performed on the second volume of gold ore 430 can be repeated for the third volume of gold ore 440. Additional gold extraction solution can be used to extract gold from the third volume of gold ore 440 as the gold extraction solution flows through the third volume of gold ore 440 via gravity. The gold extraction solution is at a temperature below the water solubility temperature of second layer 220 in multilayer film 200 so that the gold extraction solution does not permeate through multilayer film 200, but instead is collected by collection pipe 410 positioned above multilayer film 200.

The extraction yield for each of the first volume of gold ore 420, the second volume of gold ore 430, and the third volume of gold ore 430 can be approximately the same because without being bound by theory it is believed that preferential reaction of the sodium cyanide with sulfur is limited to only one volume of gold ore. Also, the extraction yield can be approximately the same because without being bound by theory it is believed that any retention of the aqueous solution by the ore material is limited to only one volume of gold ore.

When the extraction of gold from the third volume of gold ore 440 is complete, each of the first volume of gold ore 420, the second volume of gold ore 430, and the third volume of gold ore 440 can be washed with an aqueous liquid (e.g., water) having a temperature of 20° C. or greater. The aqueous liquid can be dispensed from irrigation pipe 450 positioned over the third volume of gold ore 440 so that the aqueous liquid can flow through and wash the third volume of gold ore 440 and so that the aqueous liquid can contact the multilayer film 200 between the second volume of gold ore 430 and the third volume of gold ore 440. The aqueous liquid can be dispensed at a temperature so that the temperature of the aqueous liquid is at or above the temperature at which the second layer 220 dissolves in water when the aqueous liquid contacts the second layer 220. The aqueous liquid can contact the second layer 220 through openings 215 to dissolve at least the exposed portions of second layer 220 so that the aqueous liquid can pass through multilayer film 200 via openings 215 and 225 and flow through and wash the second volume of gold ore 430. The aqueous liquid then contacts the second layer 220 through openings 215 in the multilayer film 200 between the first volume of gold ore 420 and the second volume of gold ore 430. The aqueous liquid can dissolve at least the exposed portions of layer 220 so that the aqueous liquid can pass through multilayer film 200 via openings 215 and 225 and flow through and wash the first volume of gold ore 420. The aqueous liquid does not penetrate barrier membrane 405, but is instead collected in collection pipe 410.

In some embodiments, it may be desirable to have at least one of the openings 215 in the first layer 210 at least partially overlap with at least one of the openings 225 in the third layer 230 to help facilitate flow of the aqueous wash liquid through the multilayer film 200. As mentioned above, the first layer can be laid on top of the second layer 220 and the second layer can be laid on top of the third layer. In some embodiments, at least a portion of the aqueous wash liquid can flow between the first layer 210 and the third layer 230 after the second layer 220 dissolves.

Advantageously, a multilayer film such as 200 can have chemical and mechanical properties to withstand harsh conditions in a mining environment while at the same time have desirable water-solubility properties so that an aqueous liquid can flow through the multilayer film when desired.

A multilayer film that is impermeable to a metal extraction solution can be provided between a first volume of metal ore and a second volume of metal ore so that the metal extraction solution can be collected after flowing through the second volume of metal ore that is above the multilayer film. Without being bound by theory, it is believed that such a process can decrease the elution time as compared to if the metal extraction solution had to also traverse the first volume of metal ore below the multilayer film. Also, it is believed that the extraction yield can be increased because preferential selection towards sulfur and retention due to the first volume of metal ore below the multilayer film can be avoided. Lastly, it is believed that if such a multilayer film according to one or more embodiments described herein is provided between each volume of metal ore that is approximately the same height, the same gold extraction yield may be achieved for each volume of metal ore because the preferential selection towards sulfur can be limited to only one volume of metal ore and retention by metal ore can also be limited to one volume of metal ore.

Thus, if such a multilayer film is positioned between two volumes of metal ore as described above, there is a desire that such multilayer films are impermeable to metal extraction solution during the metal extraction process yet permeable to an aqueous liquid having a temperature of 20° C. or greater that is to be dispensed after the metal extraction process is complete so that the aqueous liquid can flow through the multilayer films and wash all of the volume(s) of metal ore below the multilayer films.

Embodiments of the multilayer films will now be further described in the following illustrative examples.

Example 1

For Example 1, a polyvinyl alcohol (PVOH) film commercially available under the tradename MonoSol® M1030 from MonoSol, LLC, Portage, Ind. was used as a water-soluble layer. Also, polyethylene (PE) films were made from the resins commercially available under the tradenames DOWLEX™ 2050B and DOWLEX™ TG 2085B from the Dow Chemical Company. The polyethylene films were evaluated as mechanical properties enhancers for the multilayer film. Table 1 below shows the mechanical properties of the films separately.

TABLE 1 mechanical properties of each of the films involved in the development.

| | | | Sample # | | |
|---|---|---|---|---|---|
| | | | 1 | 2 | 3 |
| | | | M1030 | DOWLEX ™ | DOWLEX ™ |
| Property | Unit | ASTM | PVOH film | TG2085B resin film | 2050B resin film |
| Film Thickness | micrometers | — | 41 | 90 | 87 |
| DDI | (g) | 1709 | 916 | 700 | 218 |
| Puncture | (J/cm$^3$) | 5748 | 7.23 | 9.16 | 1.32 |
| Energy to break | (J) | 5748 | 2.41 | 6.7 | 0.95 |
| Elmendorf MD | (g) | 1922 | 770 | 2084 | 102 |
| Elmendorf CD | (g) | 1922 | 777 | 2226 | 194 |

A multilayer film was formed with the water-soluble PVOH layer laid between the two layers of polyethylene film (i.e., PE/PVOH/PE). Table 2 below demonstrates that this "sandwich" concept has improved mechanical properties as compared to the PVOH film alone.

TABLE 2 mechanical properties of the PE/PVOH/PE films

| | | | Sample # | |
|---|---|---|---|---|
| | | | 4 | 5 |
| | | | DOWLEX ™ TG2085B/ MonoSol ® M1030/ DOWLEX ™ TG2085B | DOWLEX ™ 2050B/ MonoSol ® M1030/ DOWLEX ™ 2050B |
| Property | Unit | ASTM | | |
| Film Thickness | micrometers | — | 220 | 220 |
| DDI | (g) | 1709 | >2000 | >2000 |
| Puncture | (J/cm$^3$) | 5748 | 7.4 | 3.81 |
| Energy to break | (J) | 5748 | 4.1 | 2.12 |
| Elmendorf MD | (g) | 1922 | >3840 | 956 |
| Elmendorf CD | (g) | 1922 | >3840 | 1617 |

Because it is desired that the multilayer film remain "solid" during the metal extraction phase so that the metal extraction solution does not penetrate the multilayer film, the PVOH film was evaluated by contacting the PVOH film with a metal extraction solution (i.e., an aqueous solution including sodium cyanide (about 0.05%) and having a pH of 9 and a temperature of about 23° C.) for 20 days. After that period of time, the PVOH film was analyzed. The PVOH film remained solid and no perforations were observed. In addition, mechanical properties of exposed PVOH film were also analyzed. Table 3, shows the results of the mechanical properties evaluation of the PVOH film (before and after exposure to the aqueous solution).

TABLE 3 mechanical properties of the PVOH film before and after being exposed to a metal extraction solution thr 20 days at 23° C.

| | | | Sample # | |
|---|---|---|---|---|
| | | | 1 | 6 |
| | | | MonoSol ® M1030 film before exposure | MonoSol ® M1030 film after exposure |
| Property | Unit | ASTM | | |
| Thickness | micrometers | — | 41 | 30 |
| DDI | (g) | 1709 | 916 | <50 |
| Puncture | (J/cm$^3$) | 5748 | 7.23 | 2.5 |
| Energy to break | (J) | 5748 | 2.41 | 0.59 |
| Elmendorf MD | (g) | 1922 | 770 | 20 |
| Elmendorf CD | (g) | 1922 | 777 | 18 |

As can be seen from Table 3, although the PVOH desirably remained solid so that the metal extraction solution could not permeate through the PVOH film, the mechanical properties of the PVOH films can be reduced to an undue degree after being exposed to the aqueous solution, which supports the usage of PE films in combination with PVOH films to form multilayer films and maintain mechanical properties of the PVOH film while the PVOH film is in contact with the metal extraction solution during the metal extraction phase. For example, including a PE film may prevent the PVOH film from tearing.

Example 2

A film was made from 100% PVOH resin commercially available under the tradename Kuraray MOWIFLEX® TC 661 from Kuraray America Inc., Houston, Tex. The water solubility of the PVOH film was evaluated by laying a pile of rocks on the PVOH film and contacting the PVOH film with hot water (90° C.). It was visually observed that the hot water dissolved at least a portion of the PVOH film, thereby indicating that such a PVOH film would be a good candidate for a second layer in a multilayer film described herein (e.g., second layer 220 in FIG. 2).

Example 3

A film was made from 50% PVOH resin (commercially available under the tradename Kuraray MOWIFLEX® TC 661 from Kuraray America Inc., Houston, Tex.) and 50% polyethylene resin (commercially available under the tradename DOWLEX™ TG2085B from The Dow Chemical Company (Midland, Mich.)). The water solubility of the film was evaluated by laying a pile of rocks on the film and contacting the film with hot water (90° C.). It was visually observed that the hot water did not dissolve any portion of the film.

What is claimed is:

1. A multilayer film comprising at least a first layer, a second layer, and a third layer, wherein the first layer comprises at least one polyethylene polymer, wherein the second layer comprises at least one water-soluble polymer, wherein the second layer is insoluble in water at a temperature of less than 20° C., wherein the second layer is soluble in water at a temperature of 20° C. or greater, and wherein the first layer has one or more openings through the first layer to expose the second layer, wherein the second layer is between the first layer and the third layer, wherein the third layer comprises at least one polyethylene polymer and has one or more openings through the third layer to expose the second layer, and wherein at least one of the openings in the first layer at least partially overlaps with at least one of the openings in the third layer.

2. The multilayer film according to claim 1, wherein the at least one polyethylene polymer comprises at least one copolymer of ethylene and at least one comonomer selected from the group consisting of $C_3$-$C_{20}$ α-olefins, wherein the copolymer of ethylene has a density in the range 0.900 to 0.960 grams/cm$^3$ and a Melt Index $I_{2.16}$ in the range of 0.1 to 4.0 decigrams/minute, wherein Melt Index $I_{2.16}$ is measured in accordance with ASTM D-1238 (condition 190° C. with a 2.16 kg load) and density is measured in accordance with ASTM D-792.

3. The multilayer film according to claim 2, wherein the at least one copolymer has a $I_{10}/I_{2.16}$ value in the range from 5 to 10, wherein $I_{2.16}$ is measured in accordance with ASTM D-1238 (condition 190° C. with a 2.16 kg load) and $I_{10}$ is measured in accordance with ASTM D-1238 (condition 190° C. with a 10 kg load).

4. The multilayer film according to claim 1, wherein the first layer has a thickness in the range from 20 to 400 micrometers, the second layer has a thickness in the range from 10 to 300 micrometers, and the third layer has a thickness in the range from 20 to 400 micrometers.

5. The multilayer film according to claim 1, wherein the at least one water soluble polymer is selected from the group consisting of polyvinyl alcohol, poly-acryl amide, and blends thereof.

6. The multilayer film according to claim 1, wherein the first layer and third layer each have a property selected from the group consisting of: a Dart Drop Impact value in the range from 50 to 1500 grams and measured in accordance with ASTM 1709, a Puncture Resistance value in the range from 0.1 to 15 Joules/cm$^3$ and measured in accordance with ASTM 5748, an Energy to Break value in the range from 0.01 to 15 Joules and measured in accordance with ASTM 5748, an Elmendorf Tear Strength MD value in the range from 10 to 5000 grams and measured in accordance with ASTM D1922, an Elmendorf Tear Strength CD value in the range from 10 to 5000 grams and measured in accordance with ASTM D1922, and combinations thereof.

7. The multilayer film according to claim 1, wherein the second layer has a property selected from the group consisting of: a Dart Drop Impact value in the range from 200 to 1500 grams and measured in accordance with ASTM 1709, a Puncture Resistance value in the range from 0.5 to 20 Joules/cm$^3$ and measured in accordance with ASTM 5748, an Energy to Break value in the range from 0.01 to 15 Joules and measured in accordance with ASTM 5748, an Elmendorf Tear Strength MD value in the range from 100 to 1500 grams and measured in accordance with ASTM D1922, an Elmendorf Tear Strength CD value in the range from 100 to 1500 grams and measured in accordance with ASTM D1922, and combinations thereof.

8. The multilayer film according to claim 1, wherein the first layer has a plurality of openings and each opening has an opening area in the range from 0.1 to 10 cm$^2$ and wherein the third layer has a plurality of openings an each opening has an opening area in the range from 0.1 to 10 cm$^2$.

9. The multilayer film according to claim 8, wherein the distance between the centers of adjacent openings in the first layer is in the range from 2 to 10 cm and the distance between the centers of adjacent openings in the third layer is in the range from 2 to 10 cm.

10. The multilayer film according to claim 8, wherein at least a portion of the first layer has an opening density in the range from 0.01 to 2 opening s/cm$^2$ and at least a portion of the third layer has an opening density in the range from 0.01 to 2 opening s/cm$^2$.

11. A method of extracting metal from metal ore, the method comprising:
providing a barrier membrane;
positioning a first volume of metal ore over the barrier membrane;
positioning a multilayer film over the first volume of metal ore, wherein the multilayer film comprises at least a first layer, a second layer, and a third layer, wherein the first layer comprises at least one polyethylene polymer, wherein the second layer comprises at least one water-soluble polymer, wherein the second layer is insoluble in water at a temperature of less than 20° C., wherein the second layer is soluble in water at a temperature of 20° C. or greater, and wherein the first layer has one or more openings through the first layer to expose the second layer, wherein the second layer is between the first layer and the third layer, wherein the third layer comprises at least one polyethylene polymer and has one or more openings through the third layer to expose the second layer, and wherein at least one of the openings in the first layer at least partially overlaps with at least one of the openings in the third layer;
positioning a second volume of metal ore over the multilayer film over; and
dispensing a metal extraction solution onto the second volume of metal ore so that the metal extraction can contact at least a portion of the second volume of metal ore to extract metal from the metal ore, wherein at least a portion of the solution flows through the second volume of metal ore and is in fluid communication with the drain system.

12. The method according to claim 11, further comprising, after dispensing the metal extraction solution, dispensing an aqueous liquid having a temperature of 20° C. or greater so that at least a portion of the second layer dissolves and permits the aqueous solution to flow through the multilayer film via the one or more openings in the first layer.

\* \* \* \* \*